United States Patent
Vasseur et al.

(10) Patent No.: US 11,063,842 B1
(45) Date of Patent: Jul. 13, 2021

(54) FORECASTING NETWORK KPIS

(71) Applicant: Cisco Technology, Inc., San Jose, CA (US)

(72) Inventors: Jean-Philippe Vasseur, Saint Martin d'Uriage (FR); Grégory Mermoud, Veyras VS (CH); Vinay Kumar Kolar, San Jose, CA (US); Pierre-Andre Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/740,051

(22) Filed: Jan. 10, 2020

(51) Int. Cl.
*H04L 12/24* (2006.01)
*G06N 20/00* (2019.01)
*H04L 12/703* (2013.01)
*H04L 12/46* (2006.01)

(52) U.S. Cl.
CPC ......... *H04L 41/5009* (2013.01); *G06N 20/00* (2019.01); *H04L 12/4633* (2013.01); *H04L 45/28* (2013.01)

(58) Field of Classification Search
None
See application file for complete search history.

(56) References Cited

U.S. PATENT DOCUMENTS

| | | | | |
|---|---|---|---|---|
| 7,490,073 | B1 * | 2/2009 | Qureshi | G06F 11/079 706/50 |
| 9,516,053 | B1 * | 12/2016 | Muddu | H04L 43/08 |
| 9,521,047 | B2 | 12/2016 | Alekseyev et al. | |
| 9,716,633 | B2 | 7/2017 | Premkumar et al. | |
| 2013/0305356 | A1 * | 11/2013 | Cohen-Ganor | G06F 21/566 726/22 |
| 2017/0124487 | A1 * | 5/2017 | Szeto | G06N 20/00 |
| 2018/0089303 | A1 | 3/2018 | Miller et al. | |
| 2018/0357559 | A1 | 12/2018 | Truong et al. | |
| 2019/0324831 | A1 * | 10/2019 | Gu | G06F 11/0793 |
| 2020/0073834 | A1 * | 3/2020 | Hagdahl | G06N 20/00 |

FOREIGN PATENT DOCUMENTS

WO    WO-2014102318  A1    7/2014

OTHER PUBLICATIONS

Hall et al., "An Introduction to Machine Learning Interpretability", Aug. 2019, 62 pages, O'Reilly Media, Inc.

(Continued)

*Primary Examiner* — Scott B Christensen
(74) *Attorney, Agent, or Firm* — Behmke Innovation Group LLC; Kenneth J. Heywood; Jonathon P. Western

(57) ABSTRACT

In one embodiment, a service receives input data from networking entities in a network. The input data comprises synchronous time series data, asynchronous event data, and an entity graph that that indicates relationships between the networking entities in the network. The service clusters the networking entities by type in a plurality of networking entity clusters. The service selects, based on a combination of the received input data, machine learning model data features. The service trains, using the selected machine learning model data features, a machine learning model to forecast a key performance indicator (KPI) for a particular one of the networking entity clusters.

20 Claims, 9 Drawing Sheets

(56) References Cited

OTHER PUBLICATIONS

"Amazon Forecast", online: https://aws.amazon.com/forecast/, printed Dec. 2, 2019, 9 pages, Amazon Web Services.

"Amazon SageMaker", online: https://en.wikipedia.org/wiki/Amazon_SageMaker, Oct. 13, 2019, 3 pages, printed Dec. 4, 2019, Wikimedia Foundation, Inc.

"MLlib | Apache Spark", online: https://spark.apache.org/mllib/, 2018, printed Dec. 4, 2019, 3 pages, The Apache Software Foundation.

\* cited by examiner

US 11,063,842 B1

FORECASTING NETWORK KPIS

TECHNICAL FIELD

The present disclosure relates generally to computer networks, and, more particularly, to forecasting network key performance indicators (KPIs).

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

The forecasting of key performance indicators (KPIs) for a network is a critical requirement to predicting network problems before they occur. However, KPI forecasting is often network-specific, as each network may include different networking entities with varying capabilities and configurations. In addition, networking data tends to be heterogeneous, (e.g., due to many different network entities), partly structured (e.g., due to the entities sharing relationships, which can sometimes be reflect in the KPIs), both numerical and categorical (e.g., the data time series may only take a finite number of values), and, more often than not, network time series are irregularly sampled.

DESCRIPTION OF EXAMPLE EMBODIMENTS

Overview

Figure 1A:
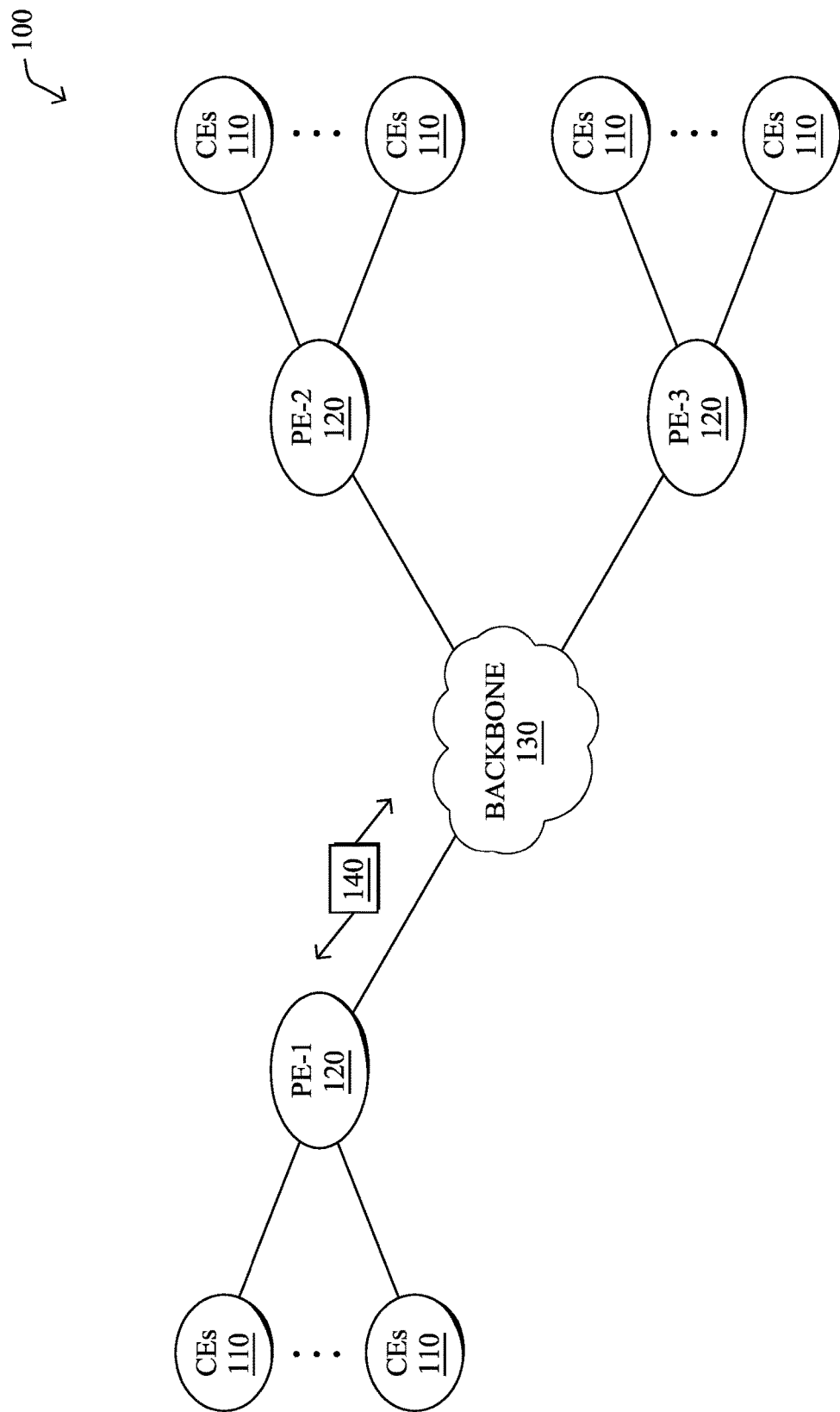
FIGS. 1A-1B illustrate an example communication network.

According to one or more embodiments of the disclosure, a service receives input data from networking entities in a network. The input data comprises synchronous time series data, asynchronous event data, and an entity graph that that indicates relationships between the networking entities in the network. The service clusters the networking entities by type in a plurality of networking entity clusters. The service selects, based on a combination of the received input data, machine learning model data features. The service trains, using the selected machine learning model data features, a machine learning model to forecast a key performance indicator (KPI) for a particular one of the networking entity clusters.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
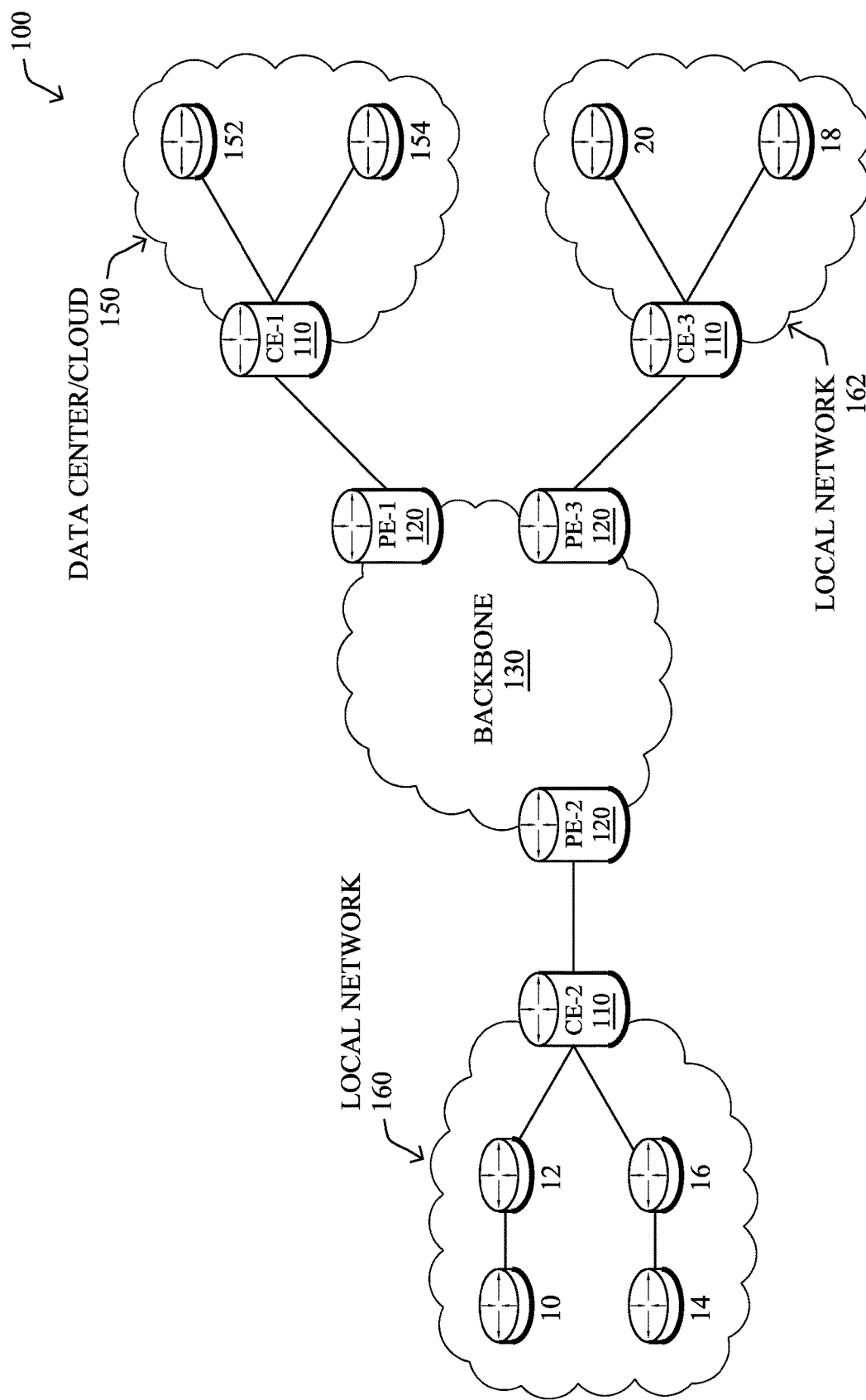

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers.

In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
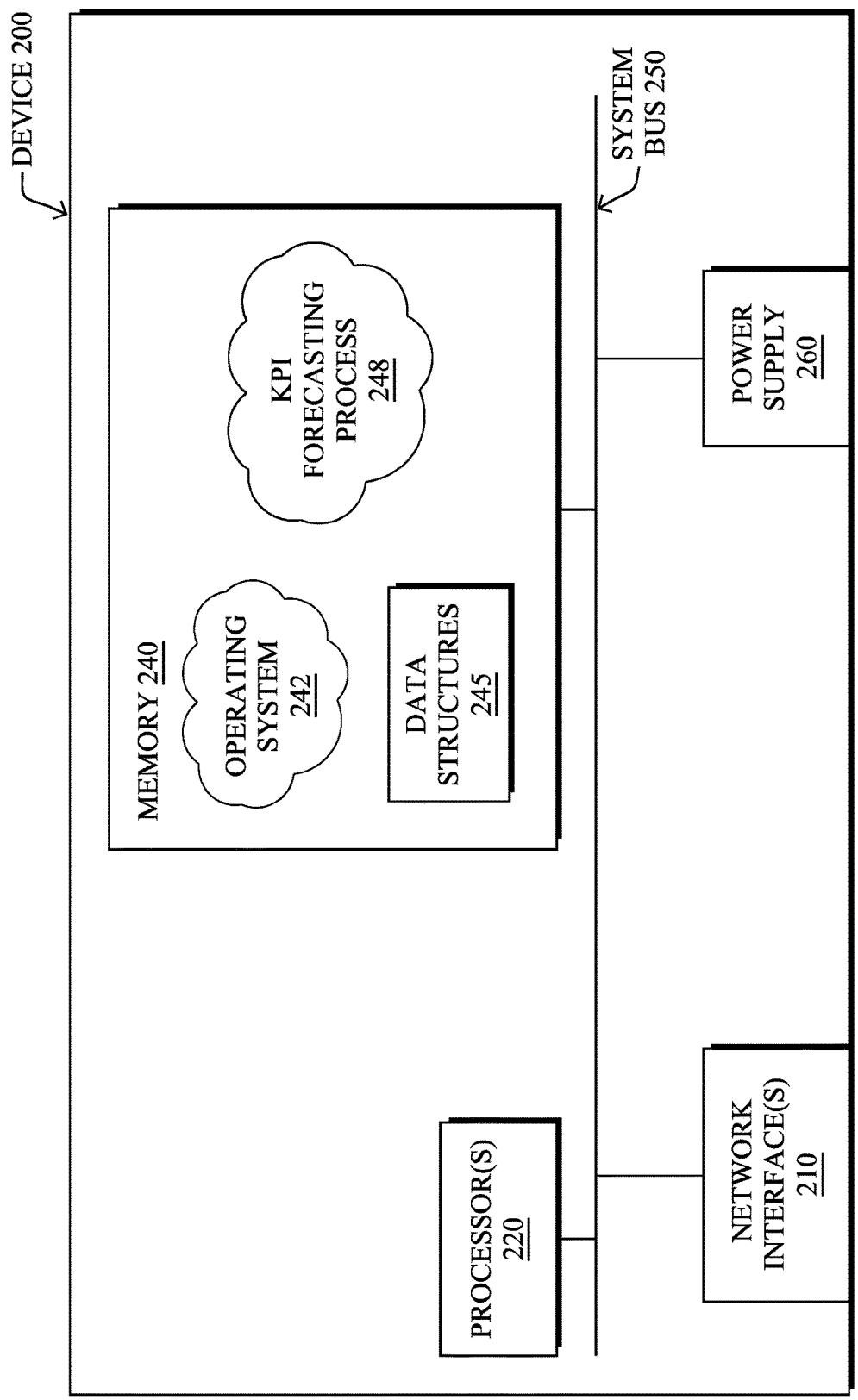
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a key performance indicator (KPI) forecasting process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

KPI forecasting process 248 includes computer executable instructions that, when executed by processor(s) 220, cause device 200 to perform KPI forecasting as part of a network monitoring infrastructure for one or more networks.

In some embodiments, KPI forecasting process 248 may utilize machine learning techniques, to forecast KPIs for one or more monitored networks. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, KPI forecasting process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior, as in the case of unsupervised anomaly detection. Semi-supervised learning models take a middle ground approach that uses a greatly reduced set of labeled training data.

Example machine learning techniques that KPI forecasting process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
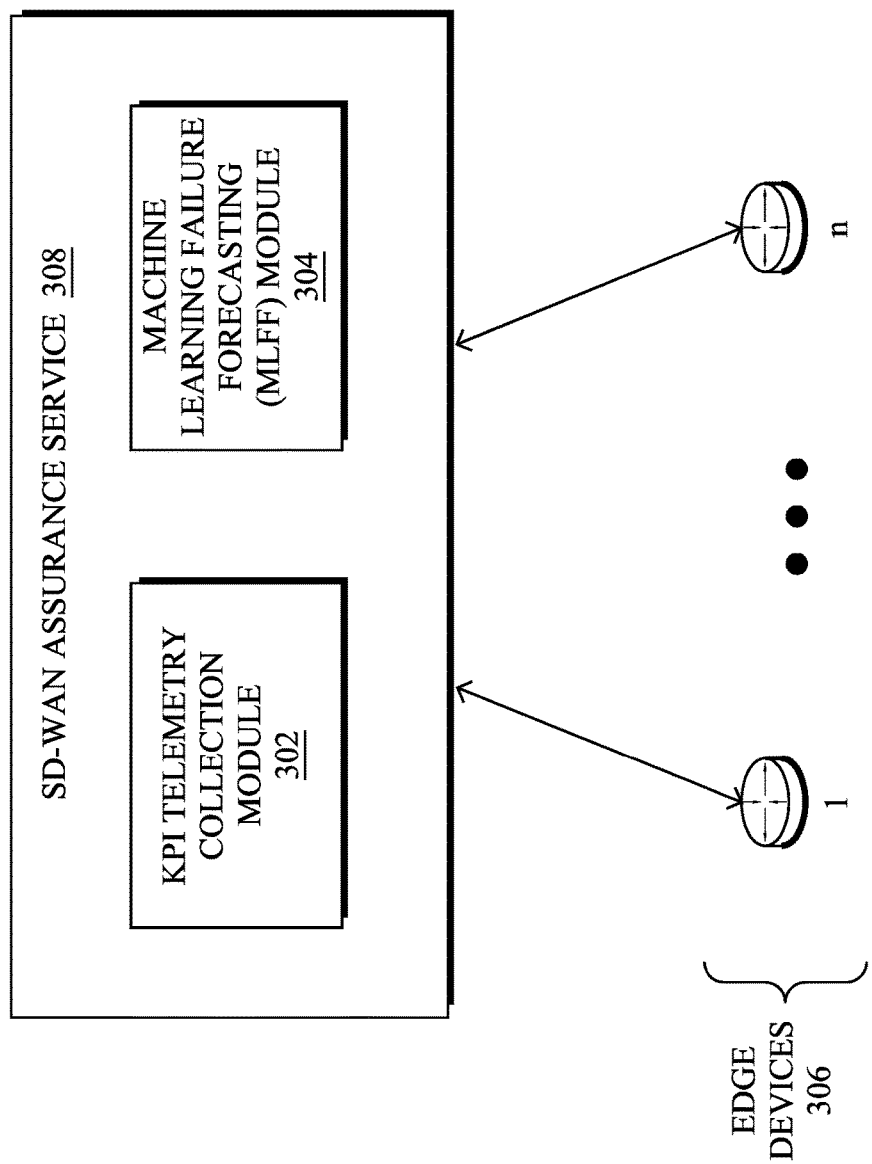
FIG. 3 illustrates an example architecture for predicting tunnel failures in a software-defined wide area network (SD-WAN)

FIG. 3 illustrates an example architecture 300 for predicting tunnel failures in a network, such as a software-defined WAN (SD-WAN), according to various embodiments. At the core of architecture 300 is SD-WAN assurance service 308 that is responsible for overseeing the operations of edge devices 306 via which tunnels are formed in the SD-WAN. As shown, SD-WAN assurance service 308 may include the following components: a telemetry collection module 302 and a machine learning failure forecasting (MLFF) module 304. These components 302-304 may be implemented in a distributed manner or implemented as their own stand-alone services, either as part of the network under observation or as a remote service. In addition, the functionalities of the components of architecture 300 may be combined, omitted, or implemented as part of other processes, as desired.

SD-WAN assurance service 308 may be in communication with any number of edge devices 306 (e.g., a first through $n^{th}$ device), such as CE routers 110, described previously. In various embodiments, edge devices 306 may be part of the same SD-WAN or, in cases in which service 308 is implemented as a cloud-based service, part of any number of different SD-WANs.

In general, there are many circumstances in a network that can lead to tunnel failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the edge device 306 involved and may be localized to the core of the service provider network (e.g., the underlying IP, 4G, 5G, etc. network), in which case the failure is non-predicable from the perspective of the edge device 306.

A first aspect of architecture 300 relates to telemetry collection module 302 obtaining the KPI telemetry data required for model training by MLFF module 304. As used herein, the term 'relevant telemetry' refers to a telemetry measurement variable with predictive power to predict tunnel failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from edge devices 306, service 310 may send a custom request to one or more of devices 306 with the objective of obtaining the list of events of interest along with the set of candidate telemetry variables with potential predictive power to predict tunnel failures. In further embodiments, edge devices 306 may instead provide the telemetry data to service 308 on a push basis (e.g., without service 308 first requesting the telemetry data).

In various embodiments, KPI telemetry collection module 302 may adjust the set of telemetry variables/parameters obtained from the edge device(s) 306 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular KPI telemetry variable by assessing the conditional probabilities involved, in further embodiments.

MLFF module 304 may also select the set of most relevant telemetry variables. In turn, telemetry collection module 302 may request that edge devices 306 measure and send these variables to service 308 periodically, since real-time variations of such telemetry is needed for forecasting tunnel down events. For example, based on the above conclusion, MLFF module 304 may determine that the CPU and memory utilizations of one or more networking devices that support a given tunnel should be sent periodically (e.g., every 1 second) by edge devices 306.

KPI telemetry collection module 304 may also request other KPI telemetry variables from device(s) 306 in response to the occurrence of certain events, such as during a rekey failure when the edge router is not able to successfully exchange the security keys with the controller. Since such events are rare and the states of the variables remain the same for longer periods of time, telemetry collection module 302 may request an event-based push request, rather than periodic messages. In other words, telemetry collection module 302 may instruct one or more of edge devices 306 to report certain telemetry variables only after occurrence of certain events. For example, Table 1 below shows some example telemetry variables and when an edge device 306 may report them to service 308:

TABLE 1

| Relevant Telemetry | Request Type |
| --- | --- |
| Memory_utilization | Requested from head and tail |
| CPU Utilization | edge routers. |
| BFD Probe Latency, Loss and Jitter | Periodically once every 1 second. |
| Queue statistics (%-age drops for different queues) | |
| Interface down event | Requested from both head and |
| Rekey exchange failure | tail edge routers |
| Router crash logs | Upon event occurrence. |

In a further embodiment, MLFF module 304 may also attempt to optimize the load imposed on the edge device(s) 306 reporting the telemetry variables to service 308. For example, MLFF module 304 may determine that the CPU and memory usages should be measured and reported every minute to service 308.

A key functionality of MLFF module 304 is to train any number of machine learning-based models to predict tunnel failures in the SD-WAN(s). Preferably, the models are time-series models trained centrally (e.g., in the cloud) using the telemetry collected by telemetry collection module 302. In one instantiation of MLFF module 304, the models may be trained on a per customer or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-customer/SD-WAN, and global (multiple SD-WAN) approaches to model training. For example, MLFF module 304 may start with the least granular approach (e.g., a global model across all customers/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision>P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the edge devices 306 may be in charge of observing the routed traffic and, on detecting a traffic type matching the policy, request specific model training by MLFF module 304, to start per-tunnel model training for that tunnel.

Prototyping of the techniques herein using simple models and input features based on coarse KPI telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict tunnel failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding edge device(s) 306 listing the set of variables along with their sampling/reporting frequencies. Note that sampling is a dynamic parameter used by MLFF module 304 computed so as to optimize the PRC of the model against the additional overhead of the edge device 306 pushing additional data to the cloud (and also generating additional logging of data on the router).

In another embodiment, MLFF module 304 may push the inference task, and the corresponding prediction model, to a specific edge device 306, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/edge device 306 are sufficient to feed the local model.

Thus, in some cases, the techniques herein support centralized model training (e.g., in the cloud), combined with the ability to perform local (on-premise) inference based on the required sampling frequency, local resources available on the edge device 306, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting (e.g., according to the QoS policy). If the bandwidth available for the telemetry used for the inference of the model exceeds the capacity, MLFF module 304 may decide to activate a local inference by pushing a prediction model to one or more of edge devices 306.

In yet another embodiment, MLFF module 304 may take a mixed approach whereby some of edge devices 306 perform the inferences locally, while others rely on SD-WAN assurance service 308 to perform the predictions.

A further embodiment of the techniques herein introduces a feedback mechanism whereby feedback regarding the predictions by a trained model is provided to SD-WAN assurance service 308. In cases in which the model is executed on an edge device 306, the edge device 306 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, service 308 may trigger MLFF module 304 to retrain the model, potentially increasing the granularity of the model, as well (e.g., by training a tunnel-specific model, etc.). In cases in which MLFF module 304 trains multiple prediction models, service 308 may evaluate the performance of each model and, based on their performances, decide that a particular one of the models should be used. Such an approach allows MLFF module 304 to dynamically switch between models, based on the data pattern currently being observed.

When failures are predicted in the cloud by SD-WAN predictive routing service 308, service 308 may similarly receive feedback from edge devices 306 regarding the predictions. For example, once a model M predicts the failure of a tunnel at a given time, MLFF module 304 may send a notification to the affected edge device 306 indicating the (list of) tunnel(s) for which a failure is predicted, along with the predicted time for the failure, and other parameters such as the failure probability $P_f$ (which can be a simple flag, a categorical variable (low, medium, high) or a real number). The edge device 306 may use $P_f$ to determine the appropriate action, such as pro-actively rerouting the traffic that would be affected by the failure onto a backup tunnel. In one embodiment, the predicted failure may be signaled to the edge device 306 using a unicast message for one or more tunnels, or a multicast messages signaling a list of predicted failure to a set of edge devices 306.

Regardless of how service 308 receives its feedback, either from the edge device 306 executing the prediction model or from MLFF module 304 executing the model, service 308 may dynamically trigger MLFF module 304 to retrain a given model. In one embodiment, the model re-training may be systematic. In another embodiment, upon reaching a plateau in terms of improvement for Max_Recall or Max_Precision, service 308 may reduce the frequency of the model training.

Figure 4A:
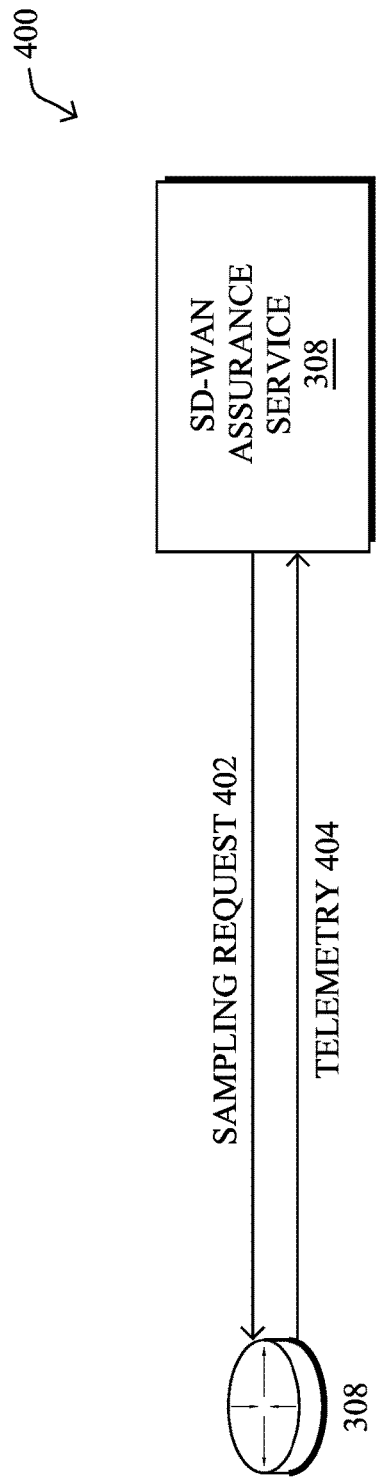
FIGS. 4A-4C illustrate examples of feedback for tunnel failure predictions.
Figure 4B:
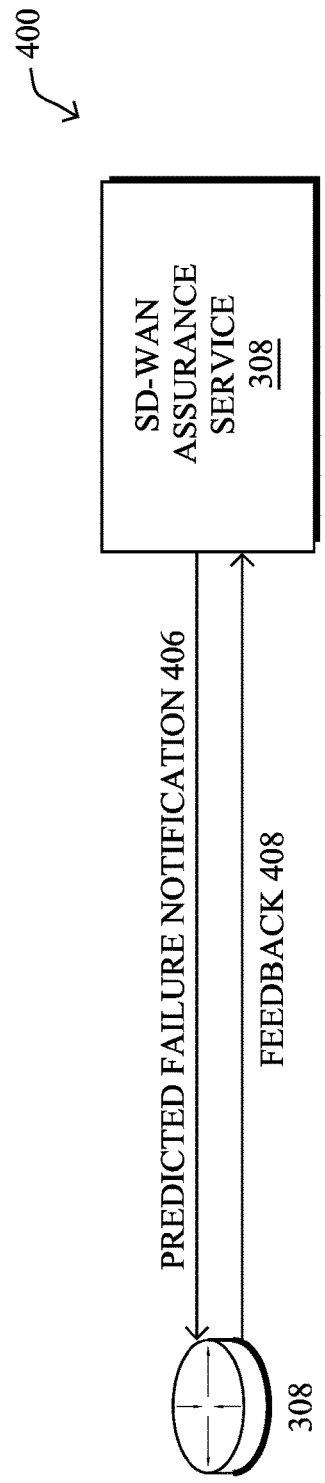
Figure 4C:
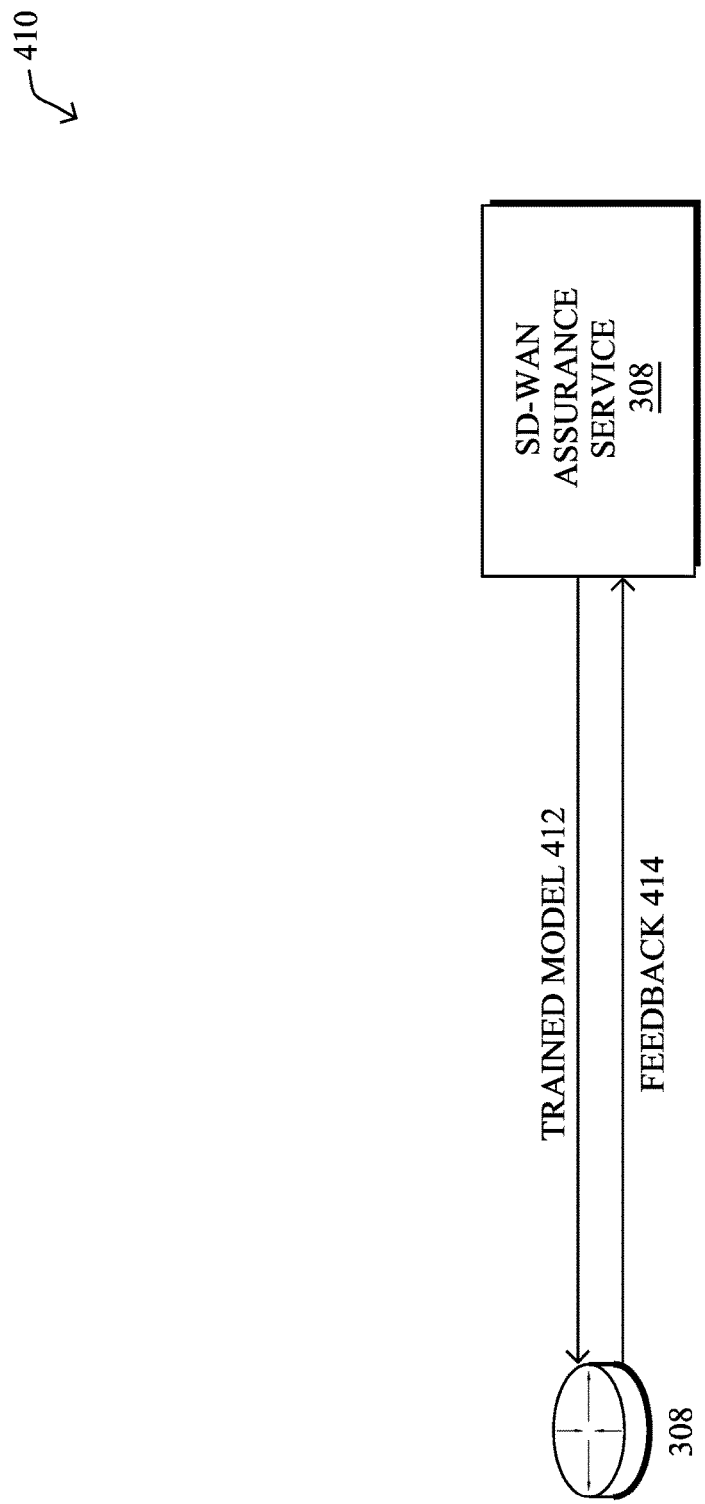

FIGS. 4A-4C illustrate examples of feedback for tunnel failure predictions, in various embodiments. As shown in example implementation 400 in FIGS. 4A-4B, assume that the trained model is executed in the cloud by SD-WAN predictive routing service 308. In such a case, service 308 may send a sampling request 402 to an edge device 306 that indicates the telemetry variables to sample and report, as well as the determined sampling/reporting period(s) for those variables. In turn, edge device 306 may report the requested telemetry 404 to service 308 for analysis. For example, service 308 may request that edge device 306 report is CPU load every minute to service 308, to predict whether the tunnel associated with edge device 306 is predicted to fail. More specifically, service 308 may use telemetry 404 as input to its trained prediction model, to determine whether telemetry 404 is indicative of a tunnel failure that will occur in the future.

When SD-WAN assurance service 308 determines that a tunnel failure is predicted, it may send a predicted failure notification 406 to edge device 306 that identifies the tunnel predicted to fail, the time at which the failure is expected to occur, and potentially the probability of failure, as well. Depending on the timing and probability of failure, edge device 306 may opt to reroute the affected traffic, or a portion thereof, to a different tunnel. In turn, edge device 306 may monitor the tunnel predicted to fail and provide feedback 408 to service 308 indicating whether the tunnel actually failed and, if so, when. Service 308 can then use feedback 408 to determine whether model retraining should be initiated, such as by training a more granular model for the SD-WAN instance or the specific tunnel under scrutiny.

FIG. 4C illustrates an alternate implementation 410 in which SD-WAN assurance service 308 pushes the failure prediction model to edge device 306 for local/on-premise inference. For example, service 308 may opt for edge device 306 to perform the local inferences, such as when model 412 requires too much bandwidth to send the needed telemetry to service 308 for cloud-based prediction. In turn, edge device 306 may use the corresponding telemetry measurements as input to trained model 412 and, if a failure is predicted, perform a corrective measure such as proactively rerouting the traffic to one or more other tunnels. In addition, edge device 306 may provide feedback 414 to service 308 that indicates false positives and/or false negatives by the model. For example, if edge device 306 reroutes traffic away from a tunnel predicted by model 412 to fail, and the tunnel does not actually fail, edge device 306 may inform service 308. Service 308 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, forecasting network KPIs is a key requirement for assessing the health of a network and to predict failures before they occur, such as tunnel failures in an SD-WAN. However, network KPI forecasting is often network-specific, as each network may include a heterogeneous set of network entities (e.g., routers, APs, etc.). In addition, the network data used to make the KPI prediction also tends to be heterogeneous (e.g., due to the diversity of the entities), partially structured (e.g., due to the relationships of the entities, which can sometimes be reflected in the KPIs), both numerical and categorical (e.g., time series may only take on a finite number of values), and, more often than not, network time series are irregularly sampled.

Forecasting Network KPIs

The techniques herein introduce an architecture to support networking forecasting services. In some aspects, the system automatically explores different combinations of synchronous, asynchronous, and/or graph-based topologies at different abstraction levels. Such data may be collected in a collaborative fashion from any entity in the network (e.g., routers, switches, etc.). In further aspects, entities may be grouped by type and behavior, allowing a different model to be built for each of them. In another aspect, data from additional elements in a network can also be gathered using an opt-in/opt-out approach. In yet another aspect, for every combination of input features and entity types, machine learning is used to assess their relevance to the KPI forecasting task at hand. A global search mechanism is also introduced herein that leverages past evaluations of different feature combinations and learned knowledge from other use cases. Finally, forecasting models for each entity and group of similar entity are generated and can be requested by any network element across the network. In yet another aspect, if the required model is not available, the training infrastructure may be automatically triggered.

Specifically, according to one or more embodiments of the disclosure as described in detail below, a service receives input data from networking entities in a network. The input data comprises synchronous time series data, asynchronous event data, and an entity graph that that indicates relationships between the networking entities in the network. The service clusters the networking entities by type in a plurality of networking entity clusters. The service selects, based on a combination of the received input data, machine learning model data features. The service trains, using the selected machine learning model data features, a machine learning model to forecast a key performance indicator (KPI) for a particular one of the networking entity clusters.

Illustratively, the techniques described herein may be performed by hardware, software, and/or firmware, such as in accordance with the KPI forecasting process 248, or another process, which may include computer executable instructions executed by the processor 220 (or independent processor of interfaces 210) to perform functions relating to the techniques described herein.

Figure 5:
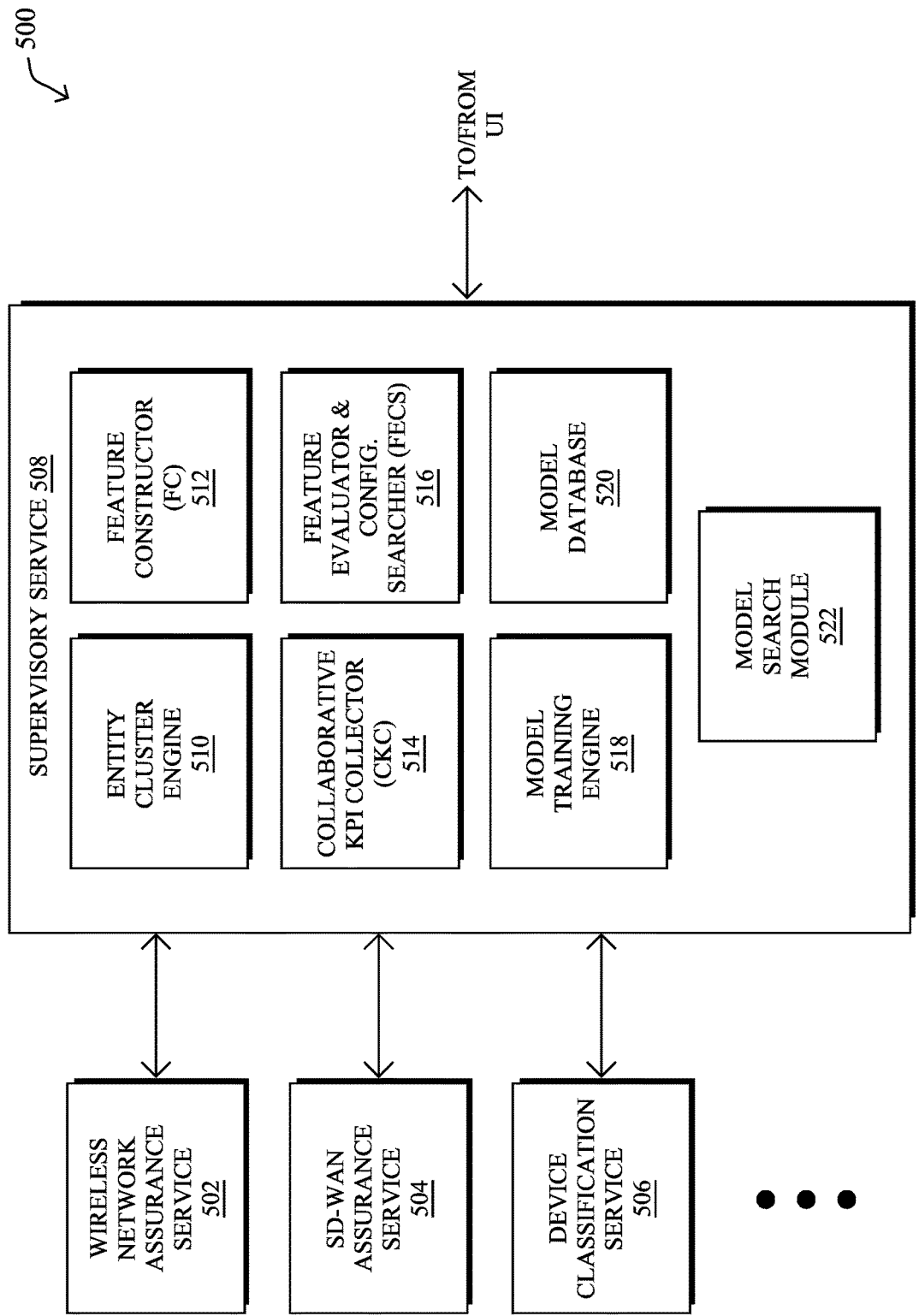
FIG. 5 illustrates an example architecture for forecasting key performance indicators (KPIs) for a network.

Operationally, FIG. 5 illustrates an example architecture 500 example architecture for forecasting key performance indicators (KPIs) for a network, according to various embodiments. As shown, architecture 500 presents an evolution over a dedicated monitoring service, such as SD-WAN assurance service 308 shown previously in FIG. 3. More specifically, a key observation is that there may be any number of different network monitoring services that each seek to leverage machine learning for their various functions. For example, such monitoring services may include a wireless network assurance service 502 configured to identify problems within a wireless network (e.g., onboarding issues, roaming issues, throughput issues, etc.), an SD-WAN assurance service 504 configured to identify problems in an SD-WAN (e.g., potential tunnel failures, etc.), a device classification service 506 configured to assign a specific device type to a device in a network (e.g., its make, model, OS version, etc.), based on its behavior, or the like. As would be appreciated, the functions of services 502-506 may be combined or omitted, as desired, or incorporated directly into service 508, in various embodiments.

Indeed, many network monitoring services may use machine learning in very similar ways, with little to no changes to their codebases and algorithms. Accordingly, in various embodiments, architecture 500 further introduces a supervisory service 508 configured to cater to the needs of multiple monitoring services, with the objective of building generic, scalable components that can be used across different monitoring services.

For example, many monitoring services may leverage the same or similar anomaly detection and prediction/forecasting components, to perform their respective functions. By centralizing these components as part of supervisory service 508, service 508 can effectively be used by services 502-506 as a single library, allowing their machine learning components to be reused. Note, however, that each use case (e.g., network deployments, etc.) may require its own set of parameter settings, such as input features, model parameters or configurations, performance success metrics, service level agreements (SLAs) or the like. Accordingly, multiple instances of supervisory service 508 may exist with different parameters, to support the various use cases. Furthermore, supervisory service 508 may be augmented with an additional processing layer (more use case specific) for improving the relevancy of the machine learning outcomes (e.g., filtering anomalies, the conditions under which an anomaly should be raised, anomaly grouping, etc.).

Said differently, supervisory service 508 is intended to be use-case agnostic, supporting the various functions of services 502-506, as well as any other network monitoring service that leverages machine learning across any number of use cases (e.g., wireless networks, switching, SD-WANs, MLOps, etc.). In addition, supervisory service 508 may, as much as possible, self-tune to provide a decent set of hyper-parameters to the underlying algorithm. Further, supervisory service 508 may be able to operate on very large datasets, supporting a high degree of scalability.

For example, the following machine learning functions may be common to services 502-506 and centralized at supervisory service 508:

Anomaly detection with peer-comparison: This function detects anomalies of networking KPIs. Rather than using a generic anomaly detection algorithm, supervisory service 508 may tune the anomaly detector for the various networking use cases, automatically. In turn, an anomaly event may only be raised when the KPI at a networking entity (e.g., access points, vEdges) is anomalous with respect to similar networking entities (i.e., its peers).

Networking KPI forecasting: This function forecasts a KPI and the uncertainty bands for the KPI for each networking entity. It can, optionally, trigger an event when the prediction output meets some event-triggering criteria specified by the user. For example, when the CPU load of a certain entity is predicted to exceed a predefined threshold, this may signify that a tunnel supported by that entity is also likely to fail. Such predictions allow the network to initiate corrective measures, such as proactively rerouting to traffic on the tunnel to another tunnel, prior to the predicted failure.

In addition, as detailed below, another key aspect of supervisory service 508 is its ability to perform peer-grouping among the various networking entities in a network or across multiple networks. For example, entities may be grouped by type, software versions, relationships with other entities (e.g., entities in similar network topologies, etc.), etc. As would be appreciated, the networking entities may be physical network devices, such as routers and APs, or can be other abstract entities such as links or tunnels. Supervisory service 508 may also employ certain rules, such as rules to filter out anomalies that are of low relevance to a network administrator.

One goal of the techniques herein is to specify the core components for forecasting networking KPIs, as well as the uncertainty bands for the KPIs on a per-entity basis. In contrast with generic forecasting platforms, supervisory service 508 is specifically configured to handle networking KPIs using its components 510-522 detailed below. While some generic forecasting platforms are available, most tasks on these platforms still require a large amount of domain-specific adjustments in order to function properly. In particular, forecasting networking KPIs is not a problem that can be easily, cast into a domain-agnostic services, because doing so would lack the support of the network-specific entities and fail to take into account the nature of the input data. Notably, network data used to make the KPI prediction also tends to be heterogeneous (e.g., due to the diversity of the entities), partially structured (e.g., due to the relationships of the entities, which can sometimes be reflected in the KPIs), both numerical and categorical (e.g., time series may only take on a finite number of values), and, more often than not, network time series are irregularly sampled.

Figure 6:
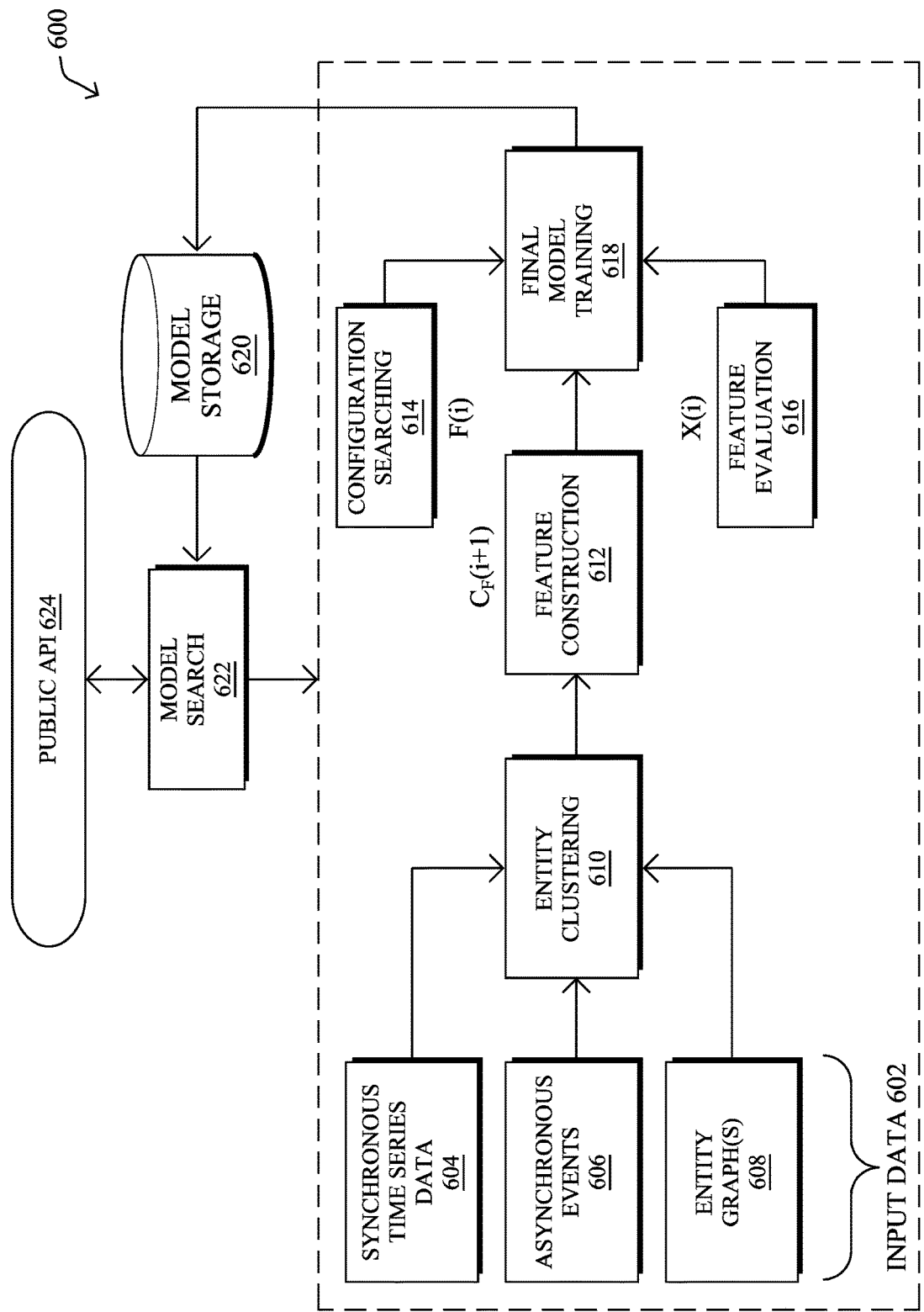
FIG. 6 illustrates a diagram showing the operations of the architecture of FIG. 5.

To better illustrate the operation of supervisory service 508, FIG. 6 shows a diagram 600 highlighting the processing steps of service 508. As shown in diagram 600, supervisory service 508 may receive input data 602 from the various networks being monitored. Such data collection can be performed either directly between supervisory service 508 and the individual networking devices or, alternatively, via a telemetry collection platform in the network (e.g., as part of any of services 502-506).

In various embodiments, the input data 602 received by supervisory service 508 may include any or all of the following:

Synchronous time series data 604, which are essentially a set of KPI measurements (e.g., CPU or memory usage, bitrate, loss, latency, etc.) indexed by a timestamp and an entity identifier (e.g., MAC address of an endpoint, IP address of a router, 5-tuple of a flow, etc.). These data frames are typically dense and regular, that is, each entity usually appears for every timestamp, although missing values can be tolerated.

Asynchronous events 606—these events may be indexed by a timestamp, entity identifier, and/or an event identifier (e.g., tunnel failure, SNMP trap type, reboot, error code, etc.). In addition, events 606 may or may not have accompanying attributes that characterize the event further.

Entity Graph(s) 608—such a graph may take the form of a time-indexed multigraph (e.g., a graph that is permitted to have multiple edges with the same end nodes, and whose structure varies in time) that represents every entity as a vertex and its relationships to other entities as a (weighted) edge. These relationships may be of different nature (also called modalities hereafter), ranging from different geographical relationships (e.g., where the presence of an edge indicates that two APs are in the same building or where the weight of the edge is the distance between two routers) to network topology (e.g., where the weight of the edge is the number of layer 2/3 hops or an indication of how many AS must be traversed to reach the other entity). As such, exploiting the entity graph as input feature of any forecasting algorithm is a considerable challenge. Indeed, as it is, a graph cannot be fed directly to a machine learning algorithm, and one needs to extract relevant features from the entity graph and combine them appropriately with the other synchronous or asynchronous data.

Entity graph 608 may also include nodes which are of different types of networking entities, in some embodiments. For example, in an SD-WAN case there might be three types of entities: controllers, edge-routers and tunnels. The relationships between them are often well defined and can be represented as a graph. A tunnel is between the head and tail edge-routers and, hence, the tunnel entity may be connected to the head and tail edge-routers in the graph. An edge-router is remotely connected to one or many controllers, which can also be represented in this graph.

Given input data 602, supervisory service 508 is configured to predict a given target KPI, with a given horizon and, potentially, a given target performance. Typically, the target performance is represented as a desired R2 or mean accuracy, although more complex SLAs may be used, as well.

By way of example, testing has shown that some of the most important features to forecast tunnel failures in SD-WAN deployments are actually asynchronous events such as SLA or Bidirectional Forwarding Detection (BFD) state changes or IPSec tunnel re-keys. Note that, in many cases, one must also extract some additional attributes of the event in order to make it truly useful (e.g., the reason for the BFD state changes or the deteriorated SLA value for SLA state changes). Table 1 below illustrates various non-limiting examples of asynchronous events 606 that supervisory service 508 may consider, when making predictions regarding SD-WAN tunnels:

TABLE 1

| Event | Characteristics |
|---|---|
| SLA Change | Raised if the service level agreement (SLA) changes for a tunnel |
| | May indicate deteriorated loss, latency, or jitter |
| BFD State Change | Raised when BFD goes up or down |
| | Sometimes indicates the reason why it went down |
| Control Connection State Change | Raised when the control connection changes (up or down) |
| | Indicates how long control was up |
| OMP Peer State Change | Indicates changes to the number of vsmarts to which a vedge is connected |
| | Indicates Overlay Management Protocol (OMP) handshake failures (e.g., graceful restart) |
| Control Connection | Indicates IP/port changes |
| Transport Locator (TLOC) IP Change | Might indicate NAT failures where the port keeps changing |
| Tunnel IPSec Rekey | Indicates that the rekey timer will expire soon, meaning that there may be a rekey failure in the future |

TABLE 1-continued

| Event | Characteristics |
|---|---|
| FIB Updates | Forwarding Information Base (FIB) updates to routing |
| | Might indicate path changes based on failures |
| Configuration Changes | Raised when the configuration changes |

In various embodiments, supervisory service 508 may include an entity cluster engine 510 that clusters the various network entities by their characteristics, as represented by step 610 in FIG. 6. Generally speaking, such clustering is performed by engine 510 to build a database of precomputed models that may deal with the heterogeneity of large-scale networks. For example, in an SD-WAN, the number of networking KPIs collected may be astronomic. Indeed, there may be millions of different tunnels across the various SD-WANs, each generating a data point every second for every SLA (delay, loss, jitter) or KPI (CPU, memory, traffic, etc.). The list of networking KPIs is also extremely vast in all networking areas: wireless, switching, core backbone, 5G. IoT, just to mention a few.

As noted, forecasting networking KPIs is challenging due to the massive heterogeneity of the networking entities involved. For example, consider the link load KPI. Typically, core links will be extremely stable in a backbone network, because of the multiplexing ratio, whereas links at the edge of the network will be subject to strong load variations. In such a case, entity cluster engine 510 may cluster the networking entities with this objective in mind. More specifically, entity cluster engine 510 may cluster the entities by link speed, region in the world, technology used (e.g., ADSL, optical, SDH, VSAT, etc.).

In other words, entity cluster engine 51 may perform a different clustering of the same entities for each of the KPIs to be forecast. To do so, entity cluster engine 510 may employ various algorithms such a density-based or hierarchical clustering. In another embodiment, entity cluster engine 510 may cluster time series of KPIs from different entities (e.g., using a time series clustering algorithm), to determine which entities have similar Km variations at the same time.

At this point, entity cluster engine 510 may compute, for each KPI to be forecast (e.g., link load, CPU failures, etc.), a set of entity groups $G_1, \ldots, G_n$ so that each cluster contains a list of time-series for similar entities (e.g., links). This allows supervisory service 508 to build a model for every such group of peer/similar networking entities and evaluate the performance with respect to that group/cluster.

If the performance of the forecasting model for a group $G_k$, denoted $P(G_k)$, is too low, then entity cluster engine 510 may iteratively gather additional networking elements for inclusion in cluster $G_i$, or remove elements from cluster $G_i$, if these appear to behave differently from the rest of the entities in that cluster. Such differences can be detected, for example, if there is a discrepancy between the performance during training and inference showing a lack of generality, or simply if the performance of the resulting model (e.g., its R2 score, etc.) is not sufficient.

Another potential component of supervisory service 508 may be feature constructor 512 that performs feature construction 612 shown in FIG. 6, according to various embodiments. In general, FC 512 may be configured (e.g., via an API) to build any relevant feature(s) that may result from the combination of the input data 602 received by supervisory service 508. In some embodiments, FC 512 may only construct those features that have been explicitly called by the caller, as specified by a configuration $C_F$ that defines which features must be enabled. The output of FIC 512 is a time- and entity-indexed data frame of features that can be fed to the forecasting algorithm.

As would be appreciated, the candidate features that FC 512 may construct can differ, depending on the KPI to be forecast. For example, the candidate features may take the form of any of the following:

- Time series for continuous KPI variables, such as client count, interference, received signal strength indicator (RSSI) for wireless networks, traffic, jitter, loss, delay, application-wise bitrates, CPU consumption, memory consumption, etc.
- Event summary for example, at every timestamp, the number of events observed since the last update is reported, along with some statistics (avg/min/max/percentiles/) of their quantitative attributes or one-hot encoding of their categorical attributes, if any.
- Neighbor features—for example, at every timestamp, aggregate statistics of the entity's neighborhood for different modalities in the entity graph are provided. For instance, FC 512 may compute the average RSSI of all adjacent entities in the geographical modality of the entity graph. Note that if the entity graph consists of multiple types of entities, then the user of service 508 may specify via configuration Cr which feature(s) EC 512 is to extract from each type of neighboring feature. For example, for each tunnel entity, Cr may specify that FC 512 should extract CPU and memory telemetry features from associated edge-router entities and controller entities.
- Neighbor events—for example, at every timestamp, the number of events observed in the entity's neighborhood is reported, along with aggregate statistics of their quantitative or categorical attributes.
- Graph properties—FC 512 may also compute some graphical properties of the entity under different modalities of the entity graph, such as centrality, neighborhood size, eccentricity, PageRank score, etc.

FC 512 may or may not construct any of the above features depending on its configuration $C_F$. Note that there are millions of different possible variants, each of them leading to a different final model performance. To this end, further mechanisms are introduced below that are responsible for selecting the most relevant features. As will be shown, these mechanisms require an initial feature vector. Accordingly, the initial configuration $C_F(0)$ used by FC 512 may be set randomly or, preferably, by an expert.

In various embodiments, supervisory service 508 may also include collaborative KPI Collector (CKC) 516. The role of CKC 516 is to provide an opt-in/opt-out mechanism that allows service 508 to gather additional input data (e.g., time series for a cluster used to train a set of pre-computed model for the forecasting of a given KPI). As pointed out earlier, adding more KPIs may be required to improve the performance of the forecasting model, increase generality, etc. Such a collaborative approach relies on opt-in/opt-out, that is, a given network element is allowed to report its willingness to provide additional input (KPIs) upon request. Such an option may be defined via policy and according to specific conditions (e.g., a KPI related to link utilization may be provided if CPU<x % and enough network capacity is available at the networking device).

Note that a similar networking entity corresponds to an entity that is close to other entities in the cluster computed by entity cluster engine 510. Several strategies can be used.

Thus, in a simple embodiment, CKC 514 may send request to networking entities that provided time series data in the past. In another embodiment, CKC 514 may multicast a request to a set of networking elements that opted-in using a custom message with a representative entity of the cluster. For example, such a message may request the reporting of time series data for KPI K for a link entity, where the link is of the type <10G, Optical, . . . > and for duration D (historical data). Note that the clustering by entity clustering engine 510 must be interpretable to CKC 514 so that CKC 514 can use representative attributes of the cluster to compute a filter for determining which entities may provide. KPIs to supervisory service 508.

In further embodiments, supervisory service 508 may also include feature evaluator & configuration searcher (FECS) 516, which is responsible for the configuration searching 614 and feature evaluation 616 tasks shown in FIG. 6.

First, FEES 516 may take as input a candidate feature set X from FC 512 and evaluates it against a given task (e.g., a particular KPI to be forecast). To achieve this, FECS 516 may leverage AutoML techniques such as automated model selection and hyperparameter optimization (e.g., using Hyperopt). The goal this is to obtain a measure P(i) of the fitness of the feature set defined by $C_F(k)$. In other words, FECS 516 aims at obtaining the best R2 score, or another model performance metric, on a validation set (e.g., a cluster, as specified above) using the feature set X.

As noted, feature selection by FC 512 may be based in part on the networking relationships indicated by an entity graph. In one embodiment, FECS 516 may instruct FC 512 to add KPIs starting from nearest neighbors to check whether the model accuracy is improved. For example, while forecasting tunnel failures for a given tunnel, the FECS 516 may instruct FC 512 (e.g., by specifying a new CO to add loss, latency and jitter KPIs to the constructed features from tunnels that originate or terminate at the source or destination edge-router. This is intuitive since, if some fluctuation (e.g., of loss) occurs at a neighboring tunnel, this typically provides good hints for predicting the KPI for a given tunnel.

Note that, in one embodiment, a tradeoff can be made by FECS 516 by trading off the accuracy of F(i) for faster computations, especially in the early iterations of the search, since the overall feature search can be very time-consuming. This can be achieved by: 1.) using smaller train and validation sets, with the cons that the performance metric may become noisier as the validation sets become smaller, 2.) using faster models, such as XGBoost, random forests, or linear regression instead of recurrent neural nets, or 3.) using techniques, such as those of Google vizier, to best control resource allocation and prioritization.

FECS 516 may also perform configuration searching 614 by tracking all previous configurations $C_F(k)$ for FC 512, where k=0, 1, . . . , i, and defines a new configuration $C_F(k+1)$ for FC 512. This can be achieved, for example, using metaheuristics such as Genetic Algorithms (GA) or a Particle Swarm Optimization (PSO). Alternatively, FECS 516 may leverage more classical feature selection approaches, such as Recursive Feature Optimization. In any case, the goal of this configuration searching is to use any prior knowledge about high performing features, in order to build a configuration that will optimize the fitness F(i) of the overall solution. When the system has converged, FECS 516 passes the final configuration to FC 512, which now builds a complete training, validation, and test dataset for the final training of the model, which is finally the one that will be put in production.

In more complex embodiments, the configuration searching by PICS 516 may entail using an internal model to guide its search of $C_F(i+1)$ given $C_F(k)$ and the corresponding $F(k)$ for k=0, 1, . . . i. For instance, FECS 516 may use a structured model that takes as input a vector that has the same dimension as $C_F$, but that contains the average fitness achieved by the configuration when the corresponding knob is activated. This model may be trained on previous searches using the final configuration as a label.

Also as shown, supervisory service 508 may include a model training engine 518 that is responsible for performing the final model training 618 step shown in FIG. 6 for each group/cluster of entities for a given KPI to be forecast. The result of this is a machine learning-based forecasting model that is optimized for the cluster of similar entities computed by entity cluster engine 510, with the aid of CKC 514 and FECS 516. Thus, each model generated by model training engine 518 is characterized by an entity type (e.g., backbone links of 10G speed, optical, etc.), a set of features, model hyperparameters used for the forecasting (e.g., as defined by FECS 516), and an expected model performance based on cross-validation.

In another embodiment, model training engine 518 may train multiple models with different expected SLAs/performance metrics. Indeed, inference may be costly, when performed on-premise (e.g., when the model is deployed to a networking entity). Accordingly, model training engine 518 stay compute multiple models, each with different inference cost (and thus using potentially different input variables and features.

In yet another embodiment, supervisory service 508 may send unsolicited update messages to the networking entities involved, to inform that a new, more optimal, model is available.

In all cases, model training engine 518 may store the trained model in model database 520, which performs the model storage step 620 shown in FIG. 6. For example, the trained model may be indexed in model database 520 by attributes such as the KPI(s) that it forecasts, the entities to which it applies, and/or its expected performance metrics.

A further potential component of supervisory service 508 is model search module 522 that performs the model searching 622 step shown in FIG. 6, in various embodiments. To do so, in some cases, model search 622 may expose a public API 624 that allows a requesting entity to request a specific model or an inference by a specified model. Note that the model searching may also leverage the concept of a 'forecasting SLA,' which specifies the desired performance of the model. For example, a forecasting request sent to supervisory service 508 may be of the following form:

```
<Forecasting_Request> :: =    <Common header>
                              <Entity>
                              <KPI>
                              <Horizon>
                              <Required SLA>
<KPI> ::= <KPI>[<KPI>]
``` where <Entity> describes the networking entity (e.g., an optical link with a given multiplexing ratio, etc.) and its key attributes, <KPI> specifies the Km to be forecast (e.g., predict the load), <Horizon> is how far in the future the model should forecast the KPI, and <Required SLA> specifies the required level of accuracy/performance of the forecasting model to be used.

On receiving a request, model search module 522 may search model database 520 for the requested model and, in response, send a custom message back to the requester. For example, such a response may be of the form:

```
<Forecasting_Reply> :: =    <Common header>
                            <Entity>
                            <KPI>
                            <Horizon>
                            <model-list>
<KPI> ::= <KPI>[<KPI>]
<model-list> := <expected-SLA, model, input-features> [<model-list>]
```

Another output parameter might be the required storage data for the model (e.g., amount of data to be accumulated by the model for a period of time $T_{past}$) and the ability for the model to predict in the future $P_{future}$ (e.g. in order to achieve a given performance of forecasting the following se of features is required with X days of history to predict Y days in advanced with a confidence of C).

Figure 7:
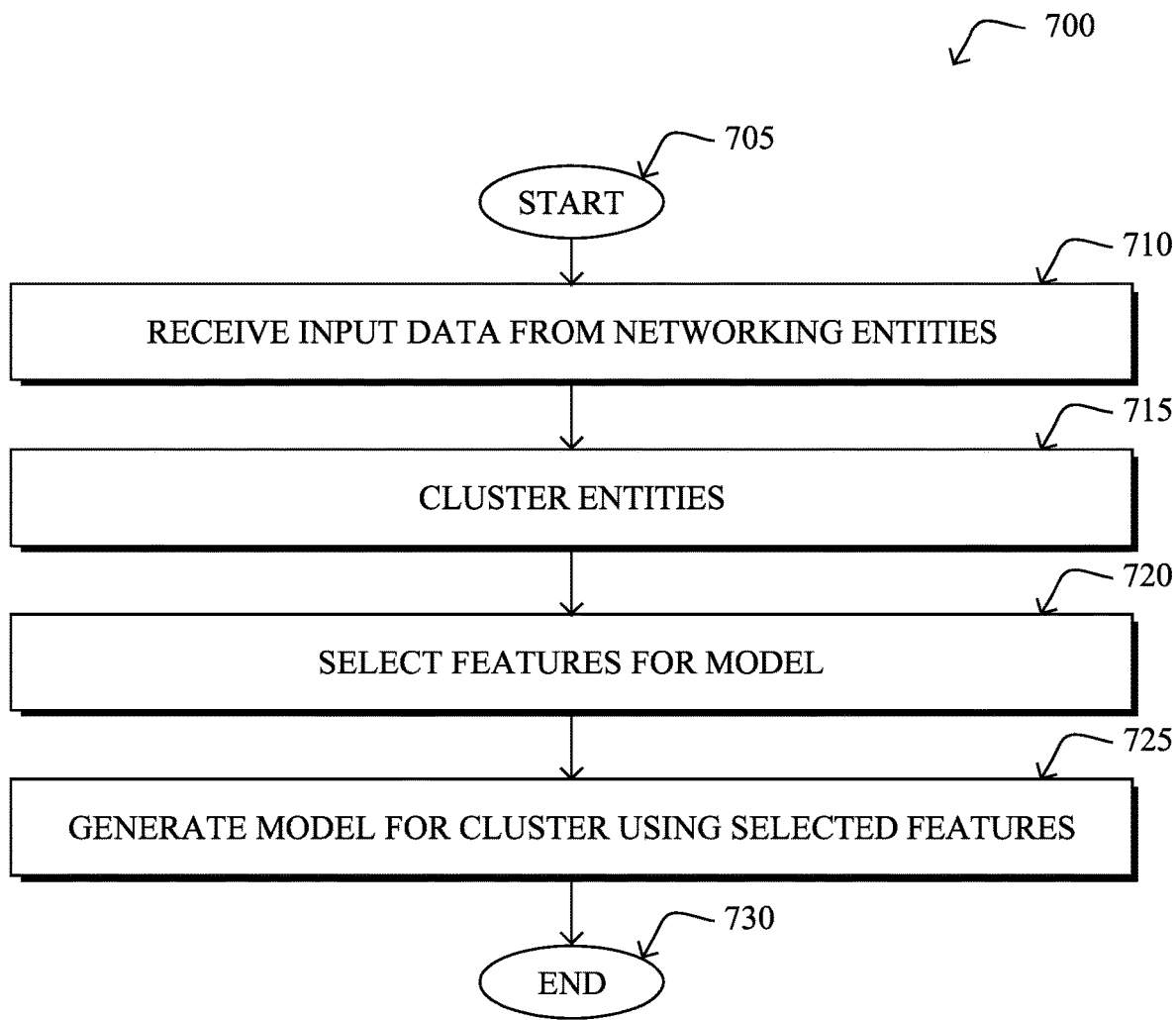
FIG. 7 illustrates an example simplified procedure for training a machine learning model to forecast a KPI.

FIG. 7 illustrates an example simplified procedure 700 for training a machine learning model to forecast a KPI, in accordance with one or more embodiments described herein. For example, a non-generic, specifically configured device may perform procedure 700 by executing stored instructions, to provide a service to one or more networks. The procedure 700 may start at step 705, and continues to step 710, where, as described in greater detail above, the service may receive input data from networking entities in a network. In various embodiments, the input data may comprise synchronous time series data, asynchronous event data, and an entity graph that that indicates relationships between the networking entities in the network. For example, the time series data may be indicative of a processor load, a memory load, a traffic load.

At step 715, the service may cluster the networking entities by type into a plurality of networking entity clusters. For example, the service may cluster the networking entities by make, model, software version, location in a network, or any other attribute, so as to group peer entities together.

At step 720, the service may select, based on a combination of the received input data, machine learning model data features, as described in greater detail above. For example, if the model is to forecast a load for a particular link in the network, the service may select the link load for the target link and/or other KPI metrics (e.g., for other links) from the input data for inclusion in the feature set for the model. In further embodiments, the feature selection may also be based in part on the clustering performed in step 715, so that select features from the input data from the entities in a particular cluster.

At step 725, as detailed above, the service may train, using the selected machine learning model data features, a machine learning model to forecast a key performance indicator (KPI) for a particular one of the networking entity clusters. In various embodiments, the service may iteratively perform the steps of procedure 700, so as to train a model that meets or exceeds a desired degree of model performance (e.g., accuracy, precision, recall, etc.). Once trained, the service may deploy the trained model to a particular networking entity for execution or, conversely, use the model to response to KPI forecasting requests from the entity (or an intermediate monitoring service in communication therewith). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an architecture for a cloud-hosted service specialized in the forecasting of networking KPIs. In some aspects, the architecture has the ability of the service to handle the heterogeneity of network telemetry data. In further aspects, the architecture provides the ability to build a database of representative networking KPI along with precomputed models where such a database is dynamically augmented thanks to a collaborative approach. In another aspect, the architecture provides the ability to request and negotiate some specific metrics and data via APIs with the network elements so as to meet the SLA/desired performance. In another aspect, the architecture is able to train and store forecasting models for a broad range of commonly forecasted KPIs, which may then retrieved and distributed across the network. Note that the API may also be accessed locally or remotely where the requestor may be hosted at the edge of the network (inference performed on-premise).

While there have been shown and described illustrative embodiments that provide for forecasting networking KPIs, it is to be understood that various other adaptations and modifications may be made within the spirit and scope of the embodiments herein. For example, while certain embodiments are described herein with respect to using certain models for purposes of KPI forecasting, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a service, input data from networking entities in a network, wherein the input data comprises synchronous time series data, asynchronous event data, and an entity graph that that indicates relationships between the networking entities in the network;
    for each key performance indicator (KPI) to be forecasted among a plurality of KPIs to be forecasted, clustering, by the service, the networking entities by type in a plurality of networking entity clusters based on characteristics of each of the networking entities, such that each KPI to be forecasted is assigned to a different networking entity cluster of the plurality of networking entity clusters and each of the networking entities is capable of being included in more than one of the plurality of networking entity clusters;
    selecting, by the service and based on a combination of the received input data, machine learning model data features based on a particular one of the KPIs to be forecasted being assigned to a particular one of the network entity clusters;
    training, by the service and using the selected machine learning model data features, a machine learning model to forecast the particular KPI to be forecasted for the particular networking entity cluster; and
    causing, by the service, the trained machine learning model to be used for forecasting the particular KPI.

2. The method as in claim 1, wherein the networking entities comprise at least one of: a router, a switch, a wireless access point, or an access point controller.

3. The method as in claim 1, wherein the causing of the trained machine learning model to be used for forecasting the particular KPI comprises:
    deploying, by the service, the trained machine learning model to one or more of the networking entities in the particular one of the networking entity clusters.

4. The method as in claim 1, wherein the causing of the trained machine learning model to be used for forecasting the particular KPI comprises:
    receiving, at the service, a KPI forecast request from one of the networking entities in the particular one of the networking entity clusters;
    using, by the service and in response to receiving the KPI forecast request, the trained machine learning model to forecast the particular KPI; and
    providing, by the service, the forecast KPI to the networking entity in the particular one of the networking entity clusters that sent the KPI forecast request.

5. The method as in claim 1, wherein the particular KPI is indicative of at least one of: a processor load, a memory load, or a traffic load.

6. The method as in claim 1, wherein selecting, by the service and based on the combination of the received input data, the machine learning model data features comprises:
    using the entity graph to select a subset of the networking entities; and
    selecting the combination of the received input data from among the subset of the networking entities.

7. The method as in claim 1, further comprising:
    using the forecast KPI to predict a tunnel failure in the network.

8. The method as in claim 1, wherein the network is a wireless network.

9. An apparatus, comprising:
    one or more network interfaces;
    a processor coupled to the network interfaces and configured to execute one or more processes; and
    a memory configured to store a process executable by the processor, the process when executed configured to:
        receive input data from networking entities in a network, wherein the input data comprises synchronous time series data, asynchronous event data, and an entity graph that that indicates relationships between the networking entities in the network;
        for each key performance indicator (KPI) to be forecasted among a plurality of KPIs to be forecasted, cluster the networking entities by type in a plurality of networking entity clusters based on characteristics of each of the networking entities, such that each KPI to be forecasted is assigned to a different networking entity cluster of the plurality of networking entity clusters and each of the networking entities is capable of being included in more than one of the plurality of networking entity clusters;

select, based on a combination of the received input data, machine learning model data features based on a particular one of the KPIs to be forecasted being assigned to a particular one of the network entity clusters;

train, using the selected machine learning model data features, a machine learning model to forecast the particular KPI to be forecasted for the particular networking entity cluster; and cause the trained machine learning model to be used for forecasting the particular KPI.

10. The apparatus as in claim 9, wherein the networking entities comprise at least one of: a router, a switch, a wireless access point, or an access point controller.

11. The apparatus as in claim 9, wherein the apparatus causes the trained machine learning model to be used for forecasting the particular KPI by:

deploying the trained machine learning model to one or more of the networking entities in the particular one of the networking entity clusters.

12. The apparatus as in claim 9, wherein the apparatus causes the trained machine learning model to be used for forecasting the particular KPI by:

receiving a KPI forecast request from one of the networking entities in the particular one of the networking entity clusters;

using, in response to receiving the KPI forecast request, the trained machine learning model to forecast the particular KPI; and providing the forecast KPI to the networking entity in the particular one of the networking entity clusters that sent the KPI forecast request.

13. The apparatus as in claim 9, wherein the particular KPI is indicative of at least one of: a processor load, a memory load, or a traffic load.

14. The apparatus as in claim 9, wherein the apparatus selects, based on the combination of the received input data, the machine learning model data features by:

using the entity graph to select a subset of the networking entities; and selecting the combination of the received input data from among the subset of the networking entities.

15. The apparatus as in claim 9, wherein the process when executed is further configured to:

use the forecast KPI to predict a tunnel failure in the network.

16. The apparatus as in claim 9, wherein the network is a wireless network.

17. A tangible, non-transitory, computer-readable medium storing program instructions that cause a service to execute a process comprising:

receiving, at the service, input data from networking entities in a network, wherein the input data comprises synchronous time series data, asynchronous event data, and an entity graph that that indicates relationships between the networking entities in the network;

for each key performance indicator (KPI) to be forecasted among a plurality of KPIs to be forecasted, clustering, by the service, the networking entities by type in a plurality of networking entity clusters based on characteristics of each of the networking entities, such that each KPI to be forecasted is assigned to a different networking entity cluster of the plurality of networking entity clusters and each of the networking entities is capable of being included in more than one of the plurality of networking entity clusters;

selecting, by the service and based on a combination of the received input data, machine learning model data features based on a particular one of the KPIs to be forecasted being assigned to a particular one of the network entity clusters;

training, by the service and using the selected machine learning model data features, a machine learning model to forecast the particular KPI to be forecasted for the particular networking entity cluster; and causing, by the service, the trained machine learning model to be used for forecasting the particular KPI.

18. The computer-readable medium as in claim 17, wherein the networking entities comprise at least one of: a router, a switch, a wireless access point, or an access point controller.

19. The computer-readable medium as in claim 17, wherein the causing of the trained machine learning model to be used for forecasting the particular KPI comprises:

deploying, by the service, the trained machine learning model to one or more of the networking entities in the particular one of the networking entity clusters.

20. The computer-readable medium as in claim 17, wherein the causing of the trained machine learning model to be used for forecasting the particular KPI comprises:

receiving, at the service, a KPI forecast request from one of the networking entities in the particular one of the networking entity clusters;

using, by the service and in response to receiving the KPI forecast request, the trained machine learning model to forecast the particular KPI; and providing, by the service, the forecast KPI to the networking entity in the particular one of the networking entity clusters that sent the KPI forecast request.

* * * * *